F. O'NEILL, Jr.
FIBROUS PLANT DECORTICATING MACHINE.
APPLICATION FILED NOV. 22, 1917.

1,390,922.

Patented Sept. 13, 1921.
4 SHEETS—SHEET 1.

Inventor
Frank O'Neill, Jr.
By Chas. J. Williamson
Attorney

F. O'NEILL, Jr.
FIBROUS PLANT DECORTICATING MACHINE.
APPLICATION FILED NOV. 22, 1917.
1,390,922.
Patented Sept. 13, 1921.
4 SHEETS—SHEET 2.
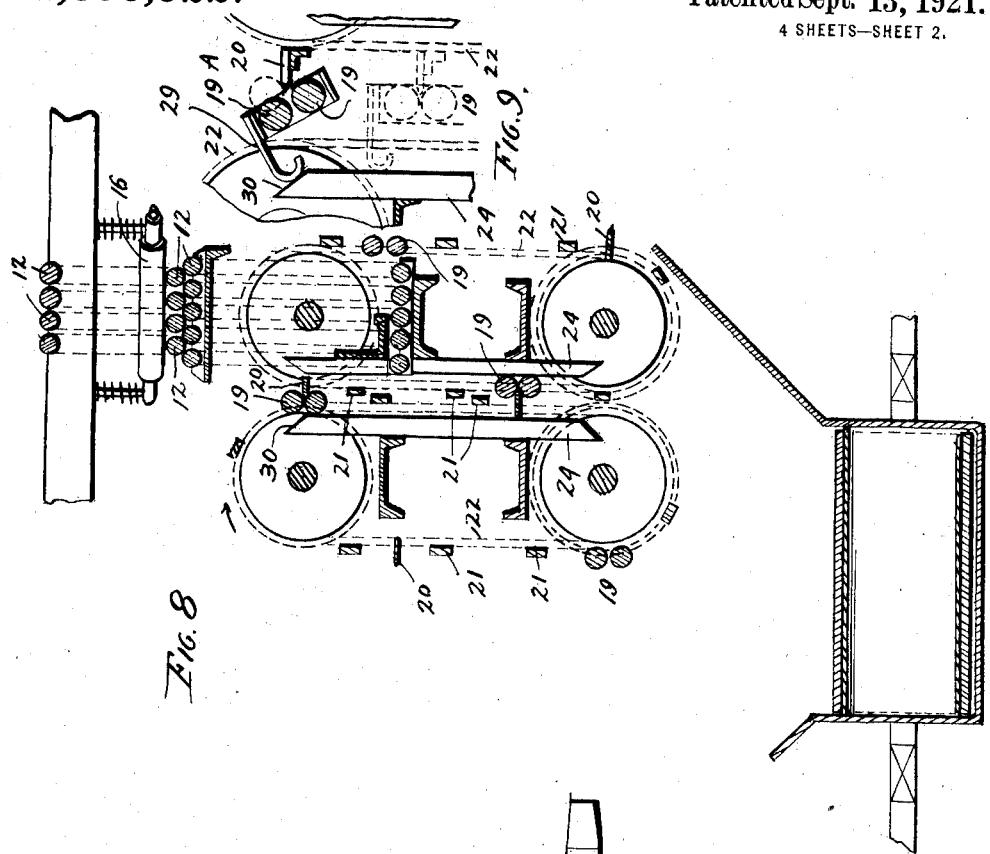
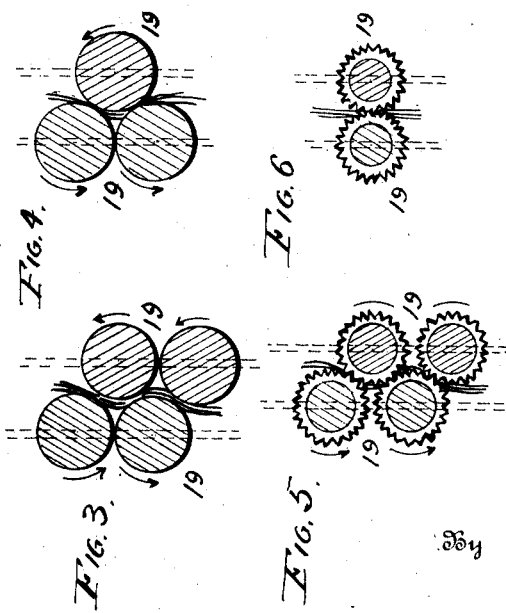
Inventor
Frank O'Neill, Jr.
By
Chas. J. Williamson
Attorney

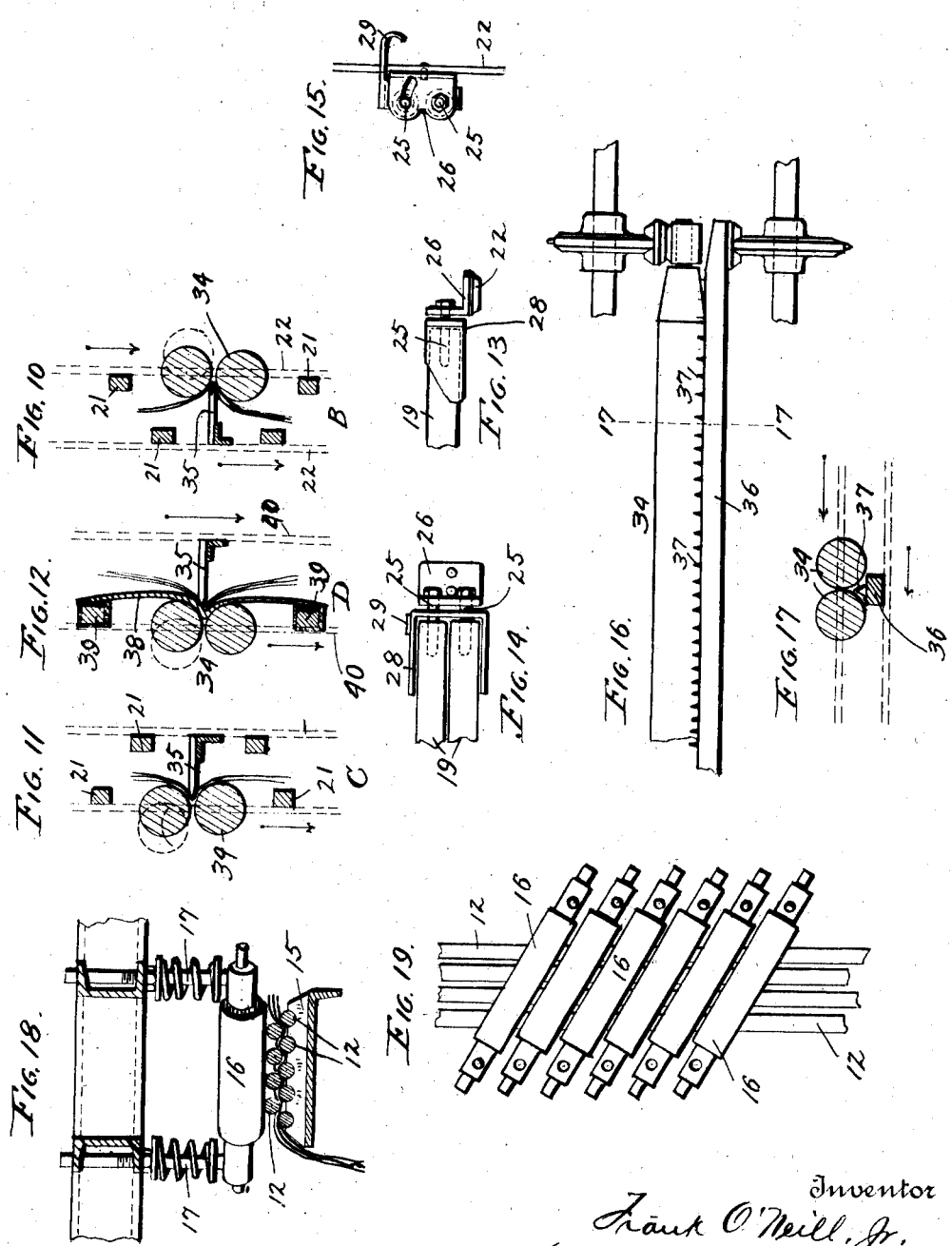

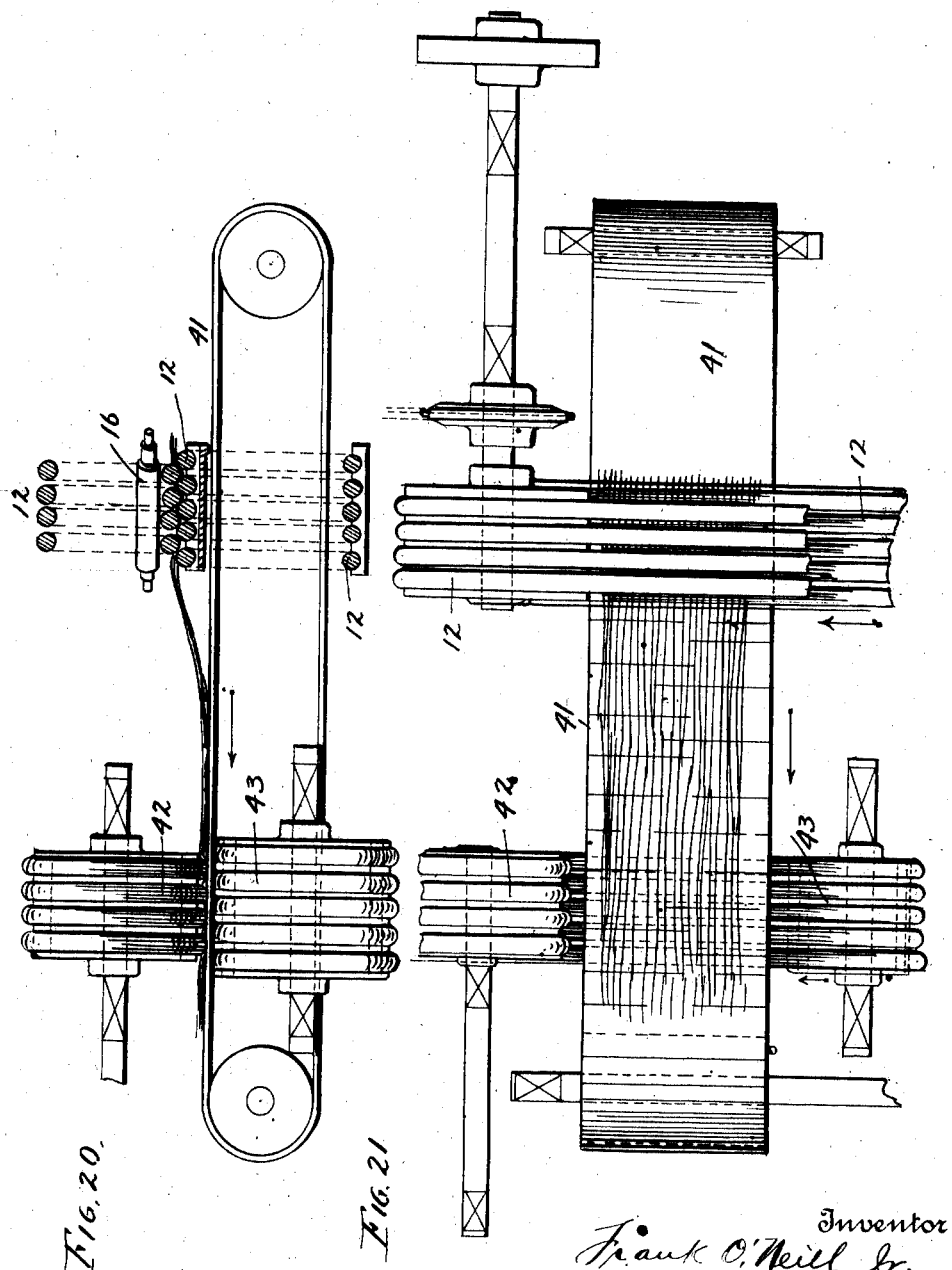

ns of fibroust patent office.

FRANK O'NEILL, JR., OF PHILADELPHIA, PENNSYLVANIA.

FIBROUS-PLANT-DECORTICATING MACHINE.

1,390,922.  Specification of Letters Patent.  Patented Sept. 13, 1921.

Application filed November 22, 1917. Serial No. 203,374.

*To all whom it may concern:*

Be it known that I, FRANK O'NEILL, Jr., of Philadelphia, in the county of Philadelphia, and in the State of Pennsylvania, have invented a certain new and useful Improvement in Fibrous-Plant-Decorticating Machines, and do hereby declare that the following is a full, clear, and exact description thereof.

My invention pertains to the art of separating fiber from fiber bearing plants and on producing my invention I have had in view its adaptation to the treatment of plants of great variety such for example as flax, ramie, hemp, jute, sisal, etc., and generally stated my object is the provision of a decorticating mechanism of such construction and organization of elements as will subject the plants to an operation that will quickly, and with a minimum of waste or injury to the fiber, and therefore economically, separate the fiber from the elements naturally accompanying the same in the plant.

In the accompanying drawings:

Fig. 3 is a vertical section on the line 3—3 of Fig. 1 through a portion of the first one of the series of decorticating mechanisms.

Fig. 4 is a similar view showing a different arrangement of softening rolls that may be employed in the first decorticating mechanism.

Fig. 5 is a similar view showing the softening rolls as provided with longitudinally corrugated or ribbed peripheries.

Fig. 6 is a view similar to Fig. 5 of a similar construction of rolls, but differently positioned relative to one another.

Fig. 7 is a detail view in side elevation of one of the softening rolls, of the first decorticating mechanism having a very desirable peripheral formation.

Fig. 8 is a vertical section on the line 8—8 of Fig. 1.

Figs. 9, 10, 11 and 12 are respectively detail views in vertical section of portions of the coöperating blades and rolls of the successive decorticating mechanisms of a series.

Figs. 13, 14 and 15 are respectively detail views in front, side, and end elevation of the devices for supporting and guiding the rolls of said decorticating mechanisms.

Fig. 16 is a detail view in side elevation of one of the rolls and a coöperating combing or hackling member.

Fig. 17 is a section on the line 17—17 of Fig. 16.

Fig. 18 is a detail view in cross section showing a form of pressure mechanism for acting on the traveling plant conveyer, that may be used.

Fig. 19 is a detail top plan view of a portion thereof.

Fig. 20 is a detail view partly in side elevation and partly in section illustrating the means for transferring the plants from one traveling carrier to the other.

Fig. 21 is a top plan view thereof.

Figure 1:
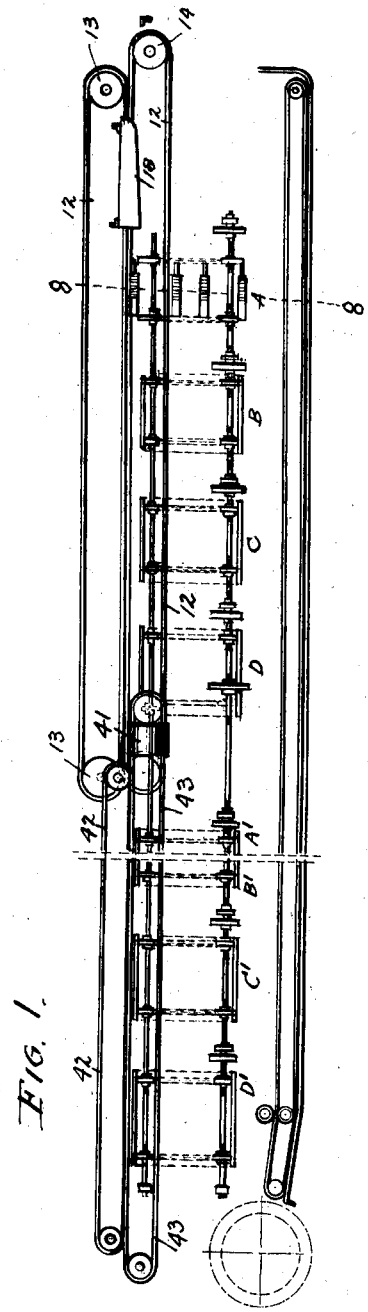
Figure 1 is a view in side elevation but somewhat diagrammatic of a decorticating mechanism embodying my invention.
Figure 2:
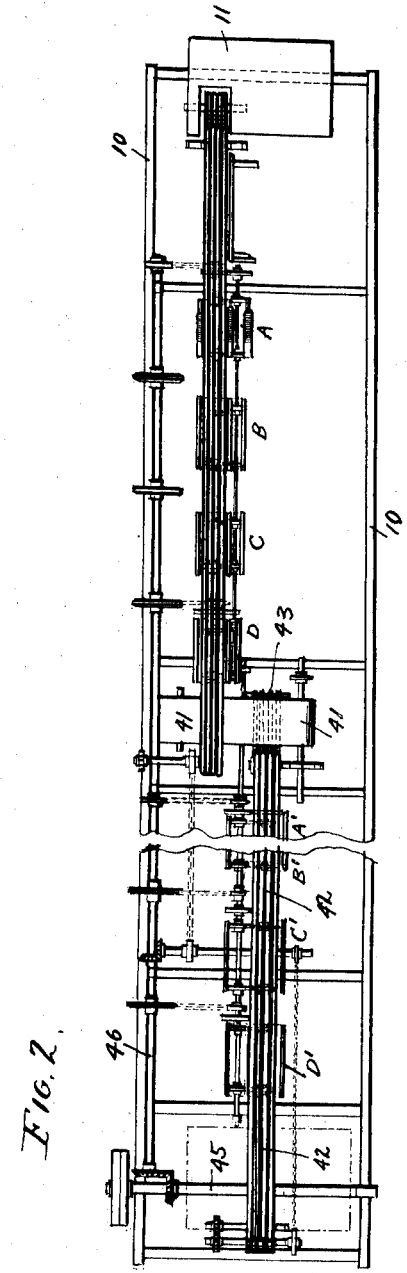
Fig. 2 is a top plan view thereof also somewhat diagrammatic.

Giving a preliminary general description of the machine shown in the drawings as one embodiment of my invention it comprises two series of decorticating mechanisms, a plant carrier for each series by which the plants are presented to the decorticating mechanisms, of the series one after another and, what is a very important feature, by which the plants are so held that the portions being acted upon by the decorticating mechanisms, extend at a sharp angle, preferably a right angle to the portions held by the carrier. The plants after being operated on for the portion of their length not gripped by the carrier are presented to the next series of decorticating mechanisms by another carrier which grips only the just finished portion of the plants so that as a result of the successive action of the two sets of decorticating mechanisms, the plants are decorticated throughout their length. Each of the decorticating mechanisms comprises two groups or series of coacting members whose form or shape varies for the different decorticating mechanisms.

The machine parts are mounted on a frame 10 which in practice is preferably carried by wheels so that it may be readily transported, but no attempt has been made in the drawings to illustrate the frame work except in a general way or the mounting of such upon carrying wheels. For lightness and strength, the frame may be made of angle iron. At one end of the frame is a horizontal feed table or platform 11 upon which the plants are placed and arranged parallel and from which they are delivered to an endless carrier by which they are securely gripped for a portion of their length at one end, the remainder being free and by which they are delivered in succession to each of a series of decorticating members designated in the drawings respectively A, B, C and D. Said plant carrier is composed of two endless aprons placed one above the other with their contiguous runs situated in a plane which is the same as the plane of the feed table 11 and each apron is composed of a number of side by side endless cables 12, the cables 12 of the upper apron being carried over pulleys 13, and the cables of the lower apron being carried over similar pulleys 14 and the cables of one apron lying opposite the spaces between the cables of the other apron (see Fig. 18) so that one so to speak knuckles into the other and thereby the interposed plants made to assume a devious form and hence will be very securely held. The cables or round belts of the lower apron in their upper run rest in longitudinally extending grooves in the upper side of a horizontal support 15 and preferably pressure is applied to the overlying cables of the upper belt as by means of a series of cross rollers 16 hung to turn freely in boxes in vertical rods 17, each of which is encircled by a coil spring that acts to press the rollers with the desired force upon the cables. The transverse rollers 16 as best shown in Fig. 19, preferably extend obliquely so that several rollers at a time exert pressure upon the same plant and at no time is the plant free from such pressure. Other means may be employed for providing the desired pressure of the two aprons upon the interposed plant portions.

Immediately, or shortly after they are caught by the two carrier aprons, the free portions of the plants encounter the lower and forwardly and downwardly inclined edge of a guide plate 18, and thereby as the plants move along with the carrier, they are gradually bent downward at the edge of the apron so that finally the free portions of the plants hang vertically, while the carrier-gripped portions lie horizontally and when in this condition the plants are presented in succession to the decorticating mechanisms of the first series which as will appear act upon them by a pulling action and it is for that reason that the plants are bent as has been described so that there is no tendency to pull the plant from between the carrier aprons and thus a possible source of loss is avoided.

The first decorticating mechanism A is constructed so as to subject the plants to a slow and gentle bending first in one direction and then in the other, rather to soften or loosen up the constituent parts thereof and this action may be secured by two endless series of opposing members, such for example as pairs of rolls 19, and a coöperating opposing blade 20 acting in the space between the pair of rolls and coöperating opposing pairs of cross bars 21, these rolls, blades and bars entering into the make up of each of the two series and being supported at or near their ends by sprocket chains 22 that pass over sprocket wheels 23 supported one above the other. The blades and rolls of one series are arranged in alternation so that in succession the plant, after being acted upon by a pair of rolls and an opposing blade is next acted upon by a pair of rolls and an opposing blade in opposite relative positions so that the plant along its length is alternately bent first in one direction and then in the opposite direction. The rolls and blades, or coöperating members of the two series at the time they are acting on the plant, travel between parallel vertical guide rails 24. Each roll of a pair is supported at its ends by a pintle 25 in an angle bracket 26, which is riveted to the adjacent sprocket chain 22, the pintles of one roller forming a pivot on which one roller may rock about the other to a limited extent fixed by a slot 27 in the bracket 26, in which the pintle of the other roller swings. Attached to the two rollers is a U-shaped guard plate 28, which extends across the ends of the rollers, the pintles of which pass through the plate, and thence for a short distance alongside each roller, and attached to one of the legs of said plate is a foot 29 having a curved end adapted to contact with the guide rail 24 and thereby swing the pair of rolls into coöperative relation with the blades 20, when the rolls and blades arrive at the entrance of the space between the two guide rails 24 to begin their action upon the suspended portions of the plants, such swinging action being due to the engagement of the foot with the bevel or inclined portion 30 at the end of the rail 24. So long as the foot is in contact with the rail the rollers are maintained in proper position for action upon the plant.

With some plants or under some conditions it is desirable that the first decorticating mechanism A shall cause first a flattening of the plants, next a splitting thereof and finally a bending sufficient to fracture the woody portion of the plant, and to accomplish that result the rollers 19 are given the configuration best shown in Fig. 7, each having for a portion of its length a smooth periphery 31 which is the portion that first acts upon the plant; next a portion that is formed of sharp circumferentially extending ridges 32 which split the plant; and the remaining portion formed of longitudinally extending ribs or ridges that sharply bend and fracture the plants.

Instead of rolls, blades and bars the first decorticating mechanism may employ only rolls and they may have the relative positions shown in Figs. 3 and 4; and they may be smooth or as shown in Figs. 5 and 6, their plant engaging peripheries may be longitudinally ribbed or corrugated and when so formed they may be arranged either as shown in Fig. 5, or as shown in Fig. 6.

The decorticating mechanism B is similar to A excepting that it is composed of series of pairs of rolls 34 and coöperating blades 35 one for each pair of rolls with comparatively sharp plant engaging edges whereas the blades 20 of the first decorticating mechanism are blunt. The third decorticating mechanism C consists of pairs of guide rolls 34 and either a sharp edged blade 35 for each pair, or a hackle or comb consisting of a bar 36 with short teeth 37 that project toward the space between the pair of rolls. The teeth or pins of the hackles are short so as to be self-clearing and thus obviate lodgment and packing of short fibers thereon. The hackles or combs are arranged so as in succession to act on opposite sides of the plants and thus a hackling action as efficient as could be obtained from long pins is secured without the disadvantage of clogging from short fibers. The last decorticating mechanism D consists of pairs of rolls 34 and a coöperating sharp blade 35 for each pair, but the pressure of such blades upon the plants is cushioned by a flexible apron 38 which is carried across the pair of rolls and supported on opposite sides thereof by being attached to cross bars 39 secured to the sprocket chains 40. The successive decorticating mechanisms run at an increased speed and this is possible not only without injury to the fiber, but to the advantage of the operation, because the successive actions are in themselves slight and by reason of the cushion devices 38 used on the last decorticator and high speed of the moving parts, a very efficient finishing action results which causes the removal of all woody particles, short tangled fibers, and, in fact, any foreign or other matter desirable to be removed from the fiber.

After leaving the last decorticating mechanism D, the plants, still in the grip of the carrier composed of the coacting two sets of cables 12, are delivered to an endless belt or carrier 41, which runs transversely of the direction of travel of said cables 12 and which receives and supports the plants in a horizontal position, they being thus changed from their depending position; and by such apron 41, the free end portions are delivered to a second and similar carrier composed of an upper apron 42, and a lower apron 43 which together constitute a plant gripping and carrying device in all respects like the other and delivering the yet untreated portions of the plants to the successive action of the series of decorticating mechanism A¹, B¹, C¹, and D¹, that are the duplicate of the decorticating mechanism A, B, C and D. The grip of the first plant carrier upon the plants is not released until the second plant carrier has gripped the plants. By referring more particularly to Figs. 20 and 21, it will be seen that the upper run of the carrier belt 41 (which is the one that receives the plants) is below the portions of the two sets of cables 12 which grip the plants at the time they are to be received by the carrier 41 and is quite close thereto and such upper run of the carrier belt 41 passes above the upper run of the lower apron 43 of the second pair of gripping and carrying cables to which the plants are delivered and by which they are gripped shortly before they are released by the first set of cables 12.

Power to drive the moving members of the organization is obtained from a main shaft 44 driven by a band wheel 45, and geared to a longitudinally extending shaft 46 from which connection is made to the various decorticating mechanisms so that they may be driven independently of one another at the desired speed and from which connection is also made with the various carriers or aprons. It is not considered necessary to describe in detail the means for the transmission of power from the shaft 46; nor to explain in what way the product of the machine consisting of the fibers and the shives and other refuse are disposed of, it being enough to say, as will of course be understood, that separation of these products is effected by carrying off the waste or refuse from the fiber and taking care of the fiber when it leaves the last decorticating mechanism.

Having thus described my invention what I claim is:

1. In a machine of the class described, the combination of a series of independently acting decorticating mechanisms, and means to present the plants thereto in succession, said decorticating mechanisms comprising moving members, and the members of successive decorticating mechanisms moving at increased speed.

2. In a machine of the class described, a decorticating mechanism comprising a blade, and opposing coacting members and a flexible shield lying between said blade and said coacting members.

3. In a machine of the class described, the combination of two similar successively acting traveling plant-suspending carriers arranged to engage the plants at different portions of their length, and two similar series of decorticating mechanisms, one for each carrier, and each having vertically movable plant-engaging members.

4. In a machine of the class described, an endless series of traveling rolls arranged in pairs, and a frame supporting a pair of said rolls, one of the rolls of a pair being loosely mounted in said frame so that it may bodily change its position.

5. In a machine of the class described, an endless series of traveling rolls arranged in pairs, a frame supporting a pair of said rolls, one of the rolls of a pair being loosely mounted in said frame so that it may bodily change its position, and a guide controlling said loosely mounted roll.

6. In a machine of the class described, an endless series of traveling rolls arranged in pairs, a frame supporting a pair of said rolls, one of the rolls of a pair being loosely mounted in said frame so that it may bodily change its position, a guide controlling said loosely mounted roll, and means for moving said loosely mounted roll composed of a stationary guide and arm connected with the roll carrying frame adapted to coact with said guide.

In testimony that I claim the foregoing I have hereunto set hand.

FRANK O'NEILL, Jr.